United States Patent [19]
Gunning, III et al.

[11] Patent Number: 5,589,963
[45] Date of Patent: Dec. 31, 1996

[54] PIXELATED COMPENSATORS FOR TWISTED NEMATIC LIQUID CRYSTAL DISPLAYS

[76] Inventors: William J. Gunning, III, 3924 Calle Valle Vista, Newbury Park, Calif. 91320; Bruce K. Winker, 4438 Sugar Maple Ct., Moorpark, Calif. 93021; Gene C. Koch, 3090 Deerfield Dr., NE., Swisher, Iowa 52338

[21] Appl. No.: 313,509

[22] Filed: Sep. 30, 1994

[51] Int. Cl.⁶ .................. G02F 1/1335; G02F 1/1337
[52] U.S. Cl. .................. 349/119; 349/118; 349/120; 349/126
[58] Field of Search ................. 359/73, 78, 67, 359/68

[56] References Cited

U.S. PATENT DOCUMENTS 5,179,457  1/1993  Hirataka et al. .................. 359/73

FOREIGN PATENT DOCUMENTS

| | | |
|---|---|---|
| 0535324 | 4/1993 | European Pat. Off. . |
| 0576342 | 12/1993 | European Pat. Off. . |
| 0576304 | 12/1993 | European Pat. Off. . |
| 0613037 | 8/1994 | European Pat. Off. . |
| 6-118406 | 4/1994 | Japan .................. 359/73 |
| 6-194645 | 7/1994 | Japan .................. 359/73 |
| 6-242437 | 9/1994 | Japan .................. 359/73 |

OTHER PUBLICATIONS

Yang, "Two–Domain Twisted Nematic and Tilted Homeotropic Liquid Crystal Displays for Active Matrix Applications," IEEE International Display Research Coference, 1991, pp. 68–72.

"Normally White Negative Birefringence film Compensated Twisted Nematic Liquid Crystal Displays with Improved Optical Performance", IBM Technical Disclosure Bulletin, vol. 36, No. 09B, 1993, p. 361.

Koike et al, "Late–News Paper: A Ful–Color TFT–LCW With a Domain–Divided Twisted–Nematic Structure," SID 92 Digest, pp. 798–801, 1992.

Takatori et al, "A Complementary TN LCD with Wide–Viewing–Angle Grayscale," Proceedings 12th Int. Display Res. Conf.—Japan Display 92, pp. 591–594, 1992.

*Primary Examiner*—William L. Sikes
*Assistant Examiner*—Ron Trice
*Attorney, Agent, or Firm*—Gregory G. Williams; M. Lee Murrah; G. A. Montanye

[57] ABSTRACT

A novel normally-white dual-domain twisted nematic liquid crystal display exhibits dramatically improved contrast and gray scale linearity stability over a wide range of viewing angles as compared to conventional dual-domain twisted nematic displays. The display incorporates one or more pixelated compensator layers internal to the liquid crystal cell. A pixelated compensator layer has a pattern wherein the orientation or retardation of the compensator layer varies according to the tilt domain structure of the display's liquid crystal material. Such a pixelated compensator layer allows optimal compensation for each of the differently oriented liquid crystal tilt domains. The pixelated compensator layer(s), and possibly one or more non-pixelated compensator layers, may be deposited on either a display's active matrix substrate or its (passive) color filter substrate, or a combination thereof.

13 Claims, 8 Drawing Sheets

PIXELATED COMPENSATORS FOR TWISTED NEMATIC LIQUID CRYSTAL DISPLAYS

REFERENCE

Co-pending U.S. patent application Ser. No. 223,251 (filed Apr. 4, 1994) and the following contemporaneously filed U.S. patent applications are hereby incorporated by reference: (i) "Inorganic Thin Film Compensator For Improved Gray Scale Performance in Twisted Nematic Liquid Crystal Displays" by William J. Gunning, III, Bruce K. Winker, Donald B. Tabor, Paul H. Kobrin, James C. Beedy, and John P. Eblen, Jr.; and (ii) "Organic Polymer O-Plate Compensator For Improved Gray Scale Performance in Twisted Nematic Liquid Crystal Displays" by Bruce K. Winker, Hong-Son Ryang, Leslie F. Warren, Jr., Charles Rosenblatt, Zili Li. and Young J. Chung. All referenced patents and patent applications are commonly assigned with this application.

BACKGROUND OF THE INVENTION

The invention relates to the field of liquid crystal display (LCD) design and, more particularly, with techniques for implementing thin-film pixelated compensator elements within a conventional liquid crystal cell.

Contrast and stability of relative gray scale intensities are important attributes in determining the quality of a liquid crystal display. The primary factor limiting the contrast achievable in a liquid crystal display is the amount of light which leaks through the display in the dark state.

In addition, the contrast ratio of a liquid crystal device also depends on the viewing angle. The contrast ratio in a typical liquid crystal display is a maximum only within a narrow viewing angle centered about normal incidence and drops off as the angle of view is increased. This loss of contrast ratio is caused by light leaking through the black state pixel elements at large viewing angles. In color liquid crystal displays, such leakage is also known to cause severe color shifts for both saturated and gray scale colors.

Single Tilt domain Liquid Crystal Display

The viewing zone of acceptable gray scale stability in a typical prior art twisted nematic liquid crystal display is severely limited because, in addition to color shifts caused by dark state leakage, the optical anisotropy of the liquid crystal molecules results in large variations in gray level transmission, i.e., a shift in the brightness-voltage curve, as a function of viewing angle. The variation is often severe enough that, at extreme vertical angles, some of the gray levels reverse their transmission levels. These limitations are particularly important for applications requiring a very high quality display, such as in avionics, where viewing of cockpit displays from both pilot and copilot seating positions is important. Such high information content displays require that the relative gray level transmission be as invariant as possible with respect to viewing angle. It would be a significant improvement in the art to provide a liquid crystal display capable of presenting a high quality, high contrast image over a wide field of view.

As shown in FIG. 1, a conventional full color single-tilt domain display 100 comprises a polarizer 105, an analyzer 110, a liquid crystal cell 115, and possibly one or more compensator layers 120. The liquid crystal cell 115 further comprises an active matrix substrate 125, a color matrix substrate 130, and liquid crystal material 135. (A polarizer 105 and an analyzer 110 both polarize electromagnetic fields. Typically, however, the term 'polarizer' refers to a polarizer element that is closest the source of light while the term 'analyzer' refers to a polarizer element that is closest the viewer of the LCD.)

Typically, the active matrix substrate 125 has deposited on it an array of thin-film transistors, transparent electrodes, address lines to activate individual liquid crystal display elements, and an alignment layer. Furthermore, the color matrix substrate 130 often has deposited on it a black matrix coating, a color filter matrix, a transparent electrode, and an alignment layer. The alignment layers on the active matrix substrate layer 125 and color matrix substrate layer 130 act in combination to induce a twisted nematic orientation to the liquid crystal material 135. The elements that comprise the active matrix substrate layer 125 and color matrix substrate layer 130 are well-known and not shown in FIG. 1; see also the discussion below of FIGS. 3 and 4, which show a number of similar elements in a color matrix substrate layer in accordance with the invention.

Dual Domain Liquid Crystal Display

One method of improving the gray scale linearity characteristics of a conventional LCD is to implement a multidomain liquid crystal display architecture. The basic structure of a dual-domain LCD is quite similar to that of the display shown in FIG. 1, with some significant differences as illustrated in FIG. 2. A collection of nematic molecules, 200, disposed between a pair of substrates 205 and 210. One substrate 205 has two rubbing directions, 215 and 220. The other substrate 210 also has two rubbing directions, 225 and 230. Rubbing direction 215 is opposite in sense to rubbing direction 220. Likewise, rubbing direction 225 (in a direction into the plane of FIG. 2) is opposite to rubbing direction 230 (in a direction out of the plane of FIG. 2). Rubbing directions 215 and 220 are arranged at approximately 90° angles to rubbing directions 225 and 230 respectively. This type of rubbing produces two tilt domains 235 and 240 within the liquid crystal layer—hence the term "dual-domain" architecture. A conventional dual-domain liquid crystal display further comprises a polarizer 245, an analyzer 250, and possibly one or more compensator layers 255 disposed between the polarizer 245 and analyzer 250. Other methods have also been reported to generate two-domain structures, e.g., Koike et al. ("Late-News Paper: A Full-Color TFT-LCW With a Domain-Divided Twisted-Nematic Structure," SID 92 Digest, pp. 798–801, 1992) and Takatori et al. ("A Complementary TN LCD with Wide-Viewing-Angle Grayscale," Proceedings 12th Int. Display Res. Conf.—Japan Display 92, pp. 591–594, 1992).

A function of a dual-domain display is to average the gray level behavior of the display over the display's positive and negative vertical viewing directions. Such averaging is known to produce improved gray level linearity.

To increase contrast over the vertical field of view requires compensation that is effective for both positive and negative viewing directions. Further, even the improved gray level linearity produced by the basic dual-domain architecture is not sufficient for many applications, e.g., avionics and large workstation displays. See, for example, Yang, "Two-Domain Twisted Nematic and Tilted Homeotropic Liquid Crystal Displays for Active Matrix Applications," Record 1991 Int. Display Res. Conf., San Diego, Calif., pp. 68–72, 1991.

Co-pending U.S. patent application Ser. No. 223,251 describes a novel compensator structure incorporating an obliquely-oriented, positively birefringent compensator element referred to as an O-plate compensator. The O-plate compensator structure significantly improves gray level linearity and provides high contrast over large variations in viewing direction for single-domain twisted-nematic LCD architectures.

The optical axis (i.e., the major axis of the refractive index ellipsoid) of an O-plate compensator must have a fixed orientation relative to the average orientation of the liquid crystal director near the central region of the liquid crystal cell in its partially-driven state. This orientation requirement makes use of prior O-plate compensator techniques incompatible with a dual-domain liquid crystal display architecture because the orientation of the liquid crystal director is different in the two domains. For the O-plate to be effective, the alignment of its optical axis must have a fixed relation to the liquid crystal director orientation. This requirement results in the need to "pixelated" the O-plate compensator element. That is, the orientation of the O-plate within each pixel must vary between the two tilt domains. The O-plate, therefore, must be spatially patterned into two separate areas having two different orientations with the pattern coinciding with that of the alternating tilt domains.

Further, because of the small pixel size (typically less than 150 micrometers, μm) relative to the thickness of the glass liquid crystal display substrate (typically 1.1 millimeter, mm), it is necessary to fabricate the pixelated O-plate compensator on an interior surface of the liquid crystal display substrate. If the pixelated O-plate were applied external to the liquid crystal cell, severe parallax problems would result. Thus, if O-plate technology is used in a dual-domain LCD, it is necessary to place the compensator element inside the liquid crystal cell.

SUMMARY OF THE INVENTION

A novel normally-white dual-domain twisted nematic liquid crystal display exhibits dramatically improved contrast and gray scale linearity stability over a wide range of viewing angles as compared to conventional dual-domain twisted nematic displays. The display incorporates one or more pixelated compensator layers internal to the liquid crystal cell. A pixelated compensator layer has a pattern wherein the orientation or retardation of the compensator layer vanes according to the tilt domain structure of the display's liquid crystal material. Such a pixelated compensator layer allows optimal compensation for each of the differently oriented liquid crystal tilt domains. The pixelated compensator layer(s), and possibly one or more non-pixelated compensator layers, may be deposited on either a display's active matrix substrate or its (passive) color filter substrate, or a combination thereof.

DETAILED DESCRIPTION OF A SPECIFIC EMBODIMENT

One illustrative embodiment of the invention is described below as it might be implemented using thin-film deposition techniques to form pixelated and un-pixelated compensator elements on the color matrix substrate of a liquid crystal display's liquid crystal cell. In the interest of clarity, not all features of an actual implementation are described in this specification. It will of course be appreciated that in the development of any such actual implementation (as in any development project), numerous implementation-specific decisions must be made to achieve the developers' specific goals and subgoals, such as compliance with system- and business-related constraints, which will vary from one implementation to another. Moreover, it will be appreciated that such a development effort might be complex and me-consuming, but would nevertheless be a routine undertaking of device engineering for those of ordinary skill having the benefit of this disclosure.

Color-Filter Substrate

Figure 1:
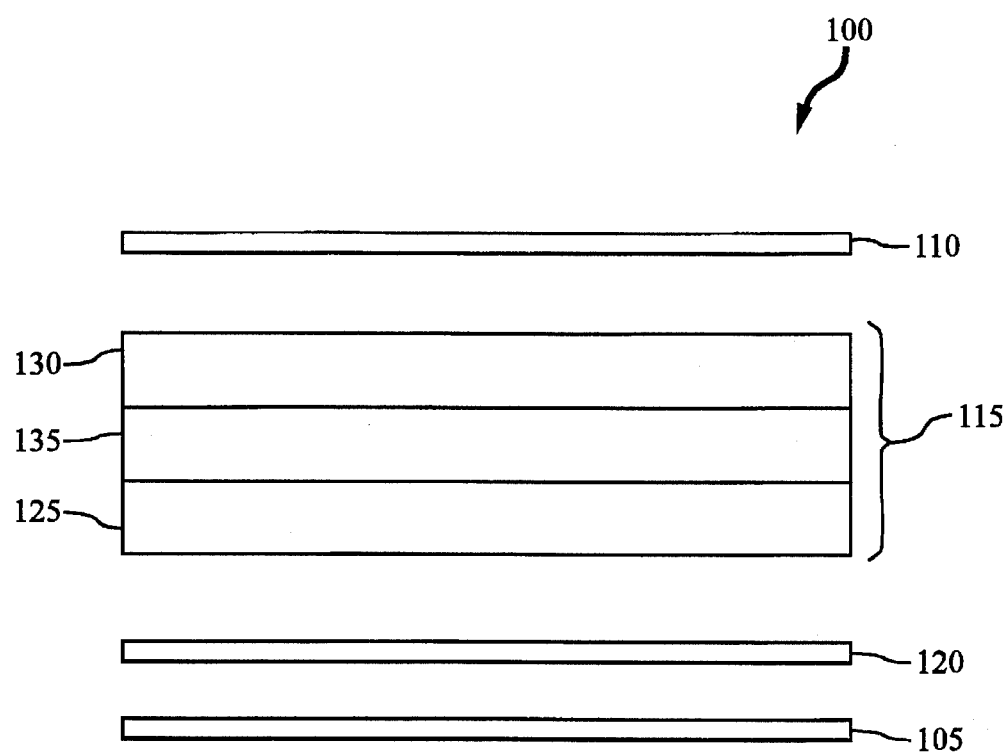
FIG. 1 is a cross-sectional view of a conventional, single-domain, liquid crystal display.
Figure 2:
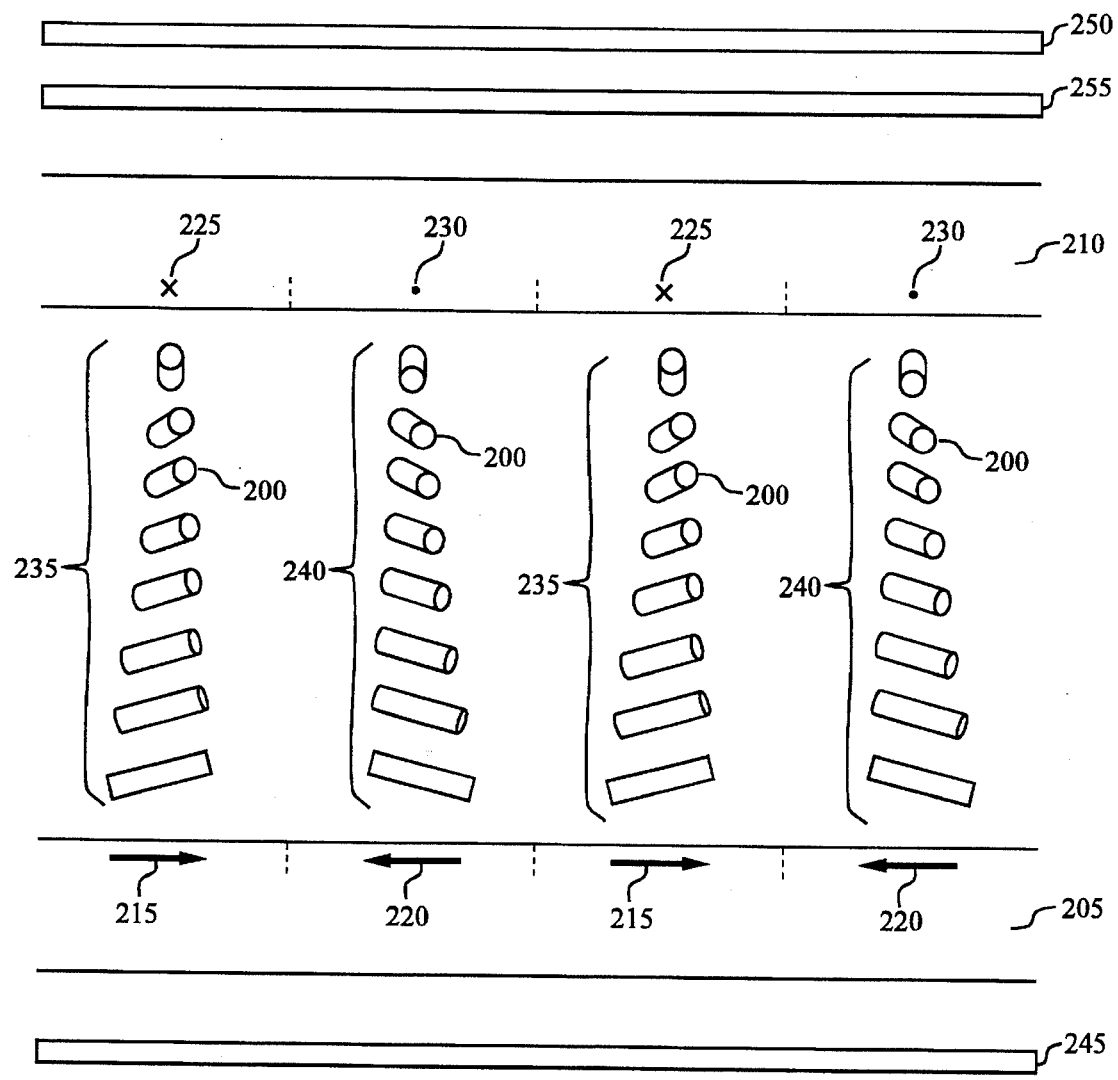
FIG. 2 is a cross-sectional view of a conventional dual-domain twisted nematic liquid crystal display.
Figure 3:
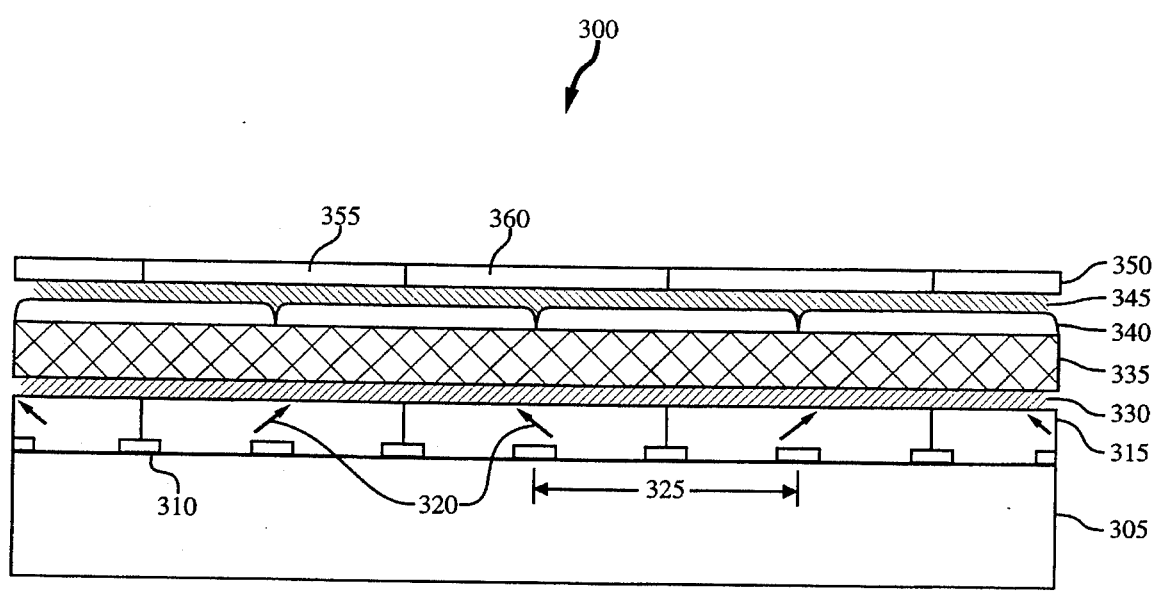
FIGS. 3 and 4 are cross-sectional and plan views, respectively, of a color filter substrate in accordance with the invention.
Figure 4:
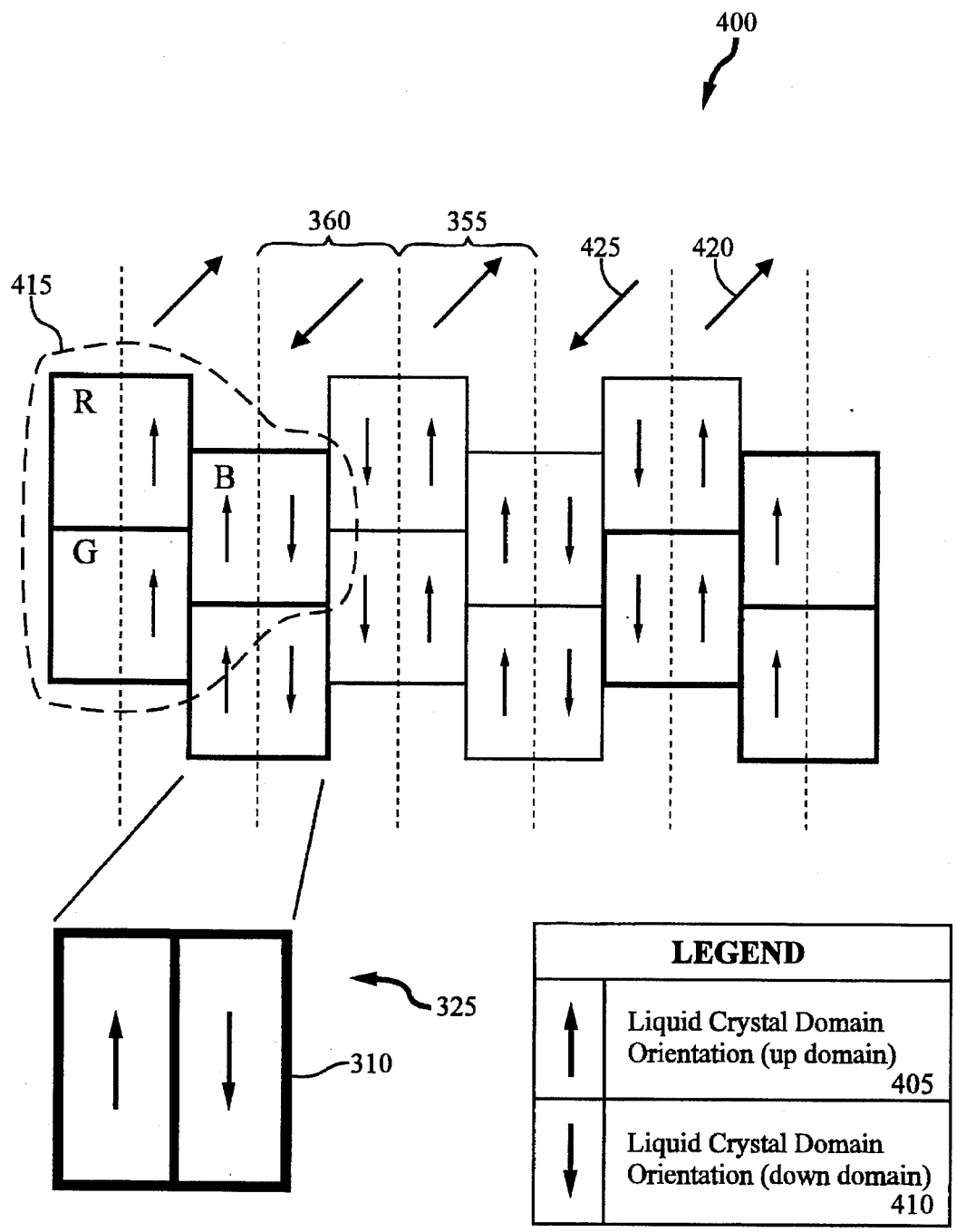

FIGS. 3 and 4 show a cross-sectional and plan view of a color filter substrate 300 for a liquid crystal cell in accordance with the invention. Other items shown in these figures are:

305: Conventional optically transparent substrate. The optically transparent substrate 305 may be of a wide variety of conventional materials such as glass, plastic, and the like.

310: Black matrix layer. The black matrix layer 310 is conventional; it may be comprised of, e.g., an opaque metallic film, a multi-layer absorbing film, or a dyed or pigmented absorbing filter. The black matrix layer 310 has a pattern that is designed to mask from view the electronic elements of the active-matrix substrate in the liquid crystal display, e.g., the thin-film transistors, storage capacitors, and address lines (not shown). Further, the black matrix layer 310 pattern obscures or hides the liquid crystal disclinations that can occur at the tilt domain boundaries of the liquid crystal material, which would otherwise cause depolarization, scattering, and light leakage through the cell.

315: O-plate compensation layer. The O-plate compensation layer 315 is a positively birefringent thin-film layer with its optical symmetry axis (assuming the symmetry to be uniaxial) oriented at an oblique angle with respect to the surface of the optically transparent substrate 305 with an angle ranging between 30° and 60°, typically 45°. The O-plate layer 315 may be fabricated from a variety of materials including obliquely deposited inorganic films, suitably oriented polymerized liquid crystal materials, or photoanisotropic organic materials. See generally the previously cited co-pending U.S. applications. The O-plate layer 315 is discussed in more detail in connection with FIG. 4.

320: O-plate orientation (see 315). The O-plate layer 315 is patterned such that its orientation of the projection of the major axis of the refractive index ellipsoid in the plane of the optically transparent substrate 305 alternates with the dual-domain orientation of the liquid crystal material within a liquid crystal cell. A compensator layer patterned in this manner is said to be pixelated.

325: Cross-sectional view of a single red, green, or blue color element as shown in more detail in a FIG. 4.

330: Buffer layer. If the O-plate layer 315 is fabricated from inorganic materials, a buffer layer 330 may be useful to prevent degradation of the O-plate compensator layer that can be caused by penetration of the O-plate compensator layer by other materials, e.g., those materials deposited subsequent to the O-plate layer. A buffer layer may consist of, for example, a thin-film of a polyimide, parylene, or polycarbonate. A buffer layer 330 fabricated from a polyimide may be conventionally rubbed to serve as an alignment layer for the deposition of subsequent compensation layers.

335: A-plate compensation layer. In the embodiment shown in FIGS. 3 and 4, the A-plate layer is not pixelated. That is, there is no spatial pattern to the A-plate layer as in the pixelated O-plate layer 315. In a more general case, the A-plate compensator layer may be patterned to optimize display performance. The A-plate compensator layer is deposited by, e.g., solvent casting of a thin-film of reactive nematic liquid crystal material onto the buffer layer 330.

340: Color filter matrix layer. The color filter matrix layer is patterned in a similar fashion, i.e., in generally the same spatial pattern, as the black matrix layer 310. (In contrast to the color filter matrix layer 340, the black matrix layer 310 has one additional stripe per element, in a region dividing the element's "up" and "down" tilt domains and which obscures the dual-domain disclination as discussed above and shown in FIG. 4.)

345: Transparent electrode layer. A conventional continuous thin-film transparent electrode is layered over the color filter matrix layer 340 to form the counter electrode for the LCD's active matrix substrate (i.e., that substrate on which thin-film transistors, storage capacitors, and address lines have been deposited) and typically comprises a thin-film of indium tin oxide (ITO).

350: Polyimide liquid-crystal alignment layer. The polyimide liquid-crystal alignment layer is applied over the ITO transparent electrode layer 345 using conventional techniques that would be known to those of ordinary skill.

355 and 360: Liquid crystal alignment regions, created by mechanically rubbing the polyimide liquid crystal alignment layer 350. This rubbing action induces the desired surface orientation of the nematic liquid crystal material. As is well-known to those of ordinary skill, a complementary alignment pattern is similarly applied to the active-matrix substrate to induce the desired multi-domain structure in the liquid crystal material. It will be apparent to those of ordinary skill that there are a number of well-known surface alignment methods to induce a multi-domain liquid crystal structure. See, for example, Koike et al. and Takatori et al.

The rubbing directions are shown in FIG. 4 by arrows 420 (a rub direction that results in an "up" oriented tilt domain as shown by arrow 405) and 425 (a rub direction that results in a "down" oriented tilt domain as shown by arrow 410). More generally, rubbing is performed to create two alternating regions having specified different orientations which, in the illustrative example of FIGS. 3 and 4, are substantially oppositely oriented.

In this illustration, "up" domains are defined as those regions of the liquid crystal material having an orientation such that, in the partially driven state, the average director near the center of the liquid crystal cell makes an average angle in a positive vertical direction, with respect to the display's normal axis. "Down" domains are defined as those regions of the liquid crystal material having an orientation such that, in the partially driven state, the average director near the center of the liquid crystal cell makes an average angle in a negative vertical direction, with respect to the display's normal axis. Here, we define the sign (positive or negative) of the viewing angle to be determined by the angle at which a viewer observes the display relative to the horizontal plane. For example, a positive vertical viewing direction refers to the observer looking down at the display from above normal.

FIG. 4 shows a plan view 400 of the color filter substrate 300. Items depicted in FIG. 4 are as follows:

400: Plan view of the color filter substrate 300.

405: "Up" domain orientation. See discussion of 355 and 360 above.

410: "Down" domain orientation. See discussion of 355 and 360 above.

415: Full color pixel. Each full color pixel 415 is composed of three elements 325, i.e., a red element, a green element, and a blue element. The elements are depicted in a representative pixel as designated by letters R, G, and B.

420: Rubbing direction to generate an "up" domain orientation. See discussion of 355 and 360 above.

425: Rubbing direction to generate a "down" domain orientation. See discussion of 355 and 360 above.

Fabrication of Pixelated Color-Filter Substrate

Figure 5:
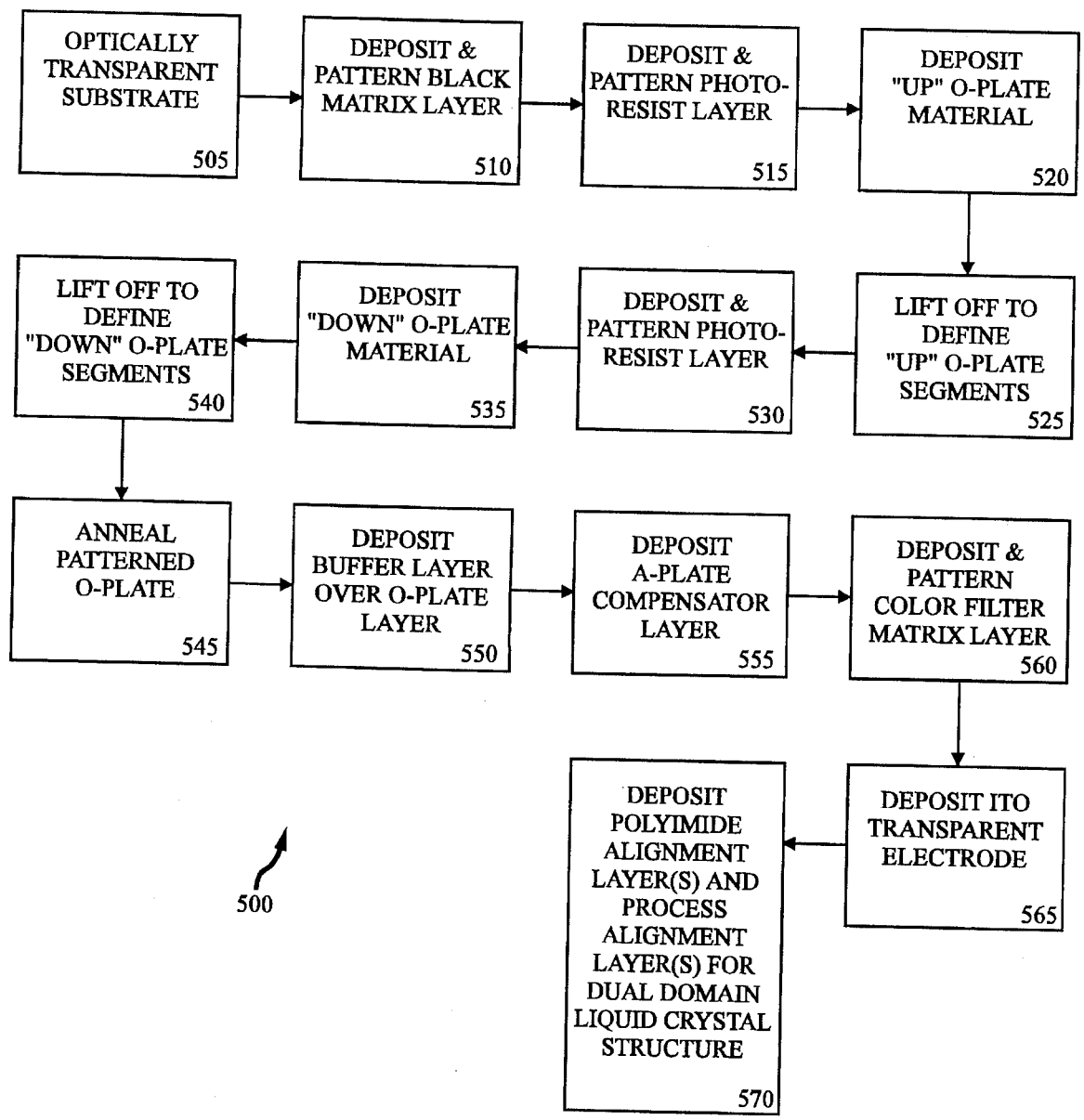
FIG. 5 is a high-level flow chart showing one exemplar process for fabricating a pixelated color filter substrate of the kind shown in FIGS. 3 and 4.

FIG. 5 is a high-level flow chart 500 showing one exemplar process for fabricating a pixelated color filter substrate 300 of the kind shown in FIGS. 3 and 4 and discussed above. Block numbers below refer to blocks in FIG. 5.

505: Provide an optically transparent substrate 305, commonly about 1 mm thick.

510: Deposit and pattern a conventional black matrix layer 310 of about 0.1 to 1.0 micrometers, μm or microns (or other convenient thickness) on the optically transparent substrate 305 by any desired technique or techniques.

(The term "deposit" encompasses any convenient deposition technique in which a layer is formed in-place; it is intended to differentiate from other techniques such as lamination, in which a pre-formed layer is bonded to a substrate. The term "deposit on" the substrate 305 is not intended to be limited to depositing a material directly on the substrate, but instead to encompass situations in which the material is deposited on one or more intermediate layers on the substrate 305.)

515: In the first step of depositing an O-plate compensator layer 315, deposit and pattern a photoresist layer (e.g., a conventional deep-UV cure material, not shown) on the optically transparent substrate 305 by any convenient method. The pattern imposed on the photoresist layer matches the pattern of the liquid crystal display's desired "down" domains. The O-plate material deposited over the photoresist pattern will be lifted off.

520: Deposit a thin-film layer of O-plate material that has an optical symmetry orientation in the desired "up" direction onto the optically transparent substrate 305.

525: Perform a conventional lift-off process to leave behind O-plate layer segments in the O-plate material that correspond to the liquid crystal's desired "up" domain regions.

530: Deposit and pattern a photoresist layer (not shown) on the optically transparent substrate 305 by any convenient method. The pattern imposed on the photoresist layer matches the pattern of the liquid crystal display's desired "up" domains.

535: Deposit a thin-film layer of O-plate material that has an optical symmetry orientation in the desired "down" direction onto the optically transparent substrate 305.

540: Perform a conventional lift-off process to leaves behind O-plate layer segments in the O-plate material that correspond to the desired "down" domain regions.

545: If an inorganic O-plate material is used, anneal the optically transparent substrate 305 by any convenient method.

At this point, the optically transparent substrate 305 has an O-plate layer 315 of about, e.g., 1 to 1.3 microns deposited on it; the actual thickness will depend on the specific design of the compensator structure and would be a matter of routine engineering for those of ordinary skill having the benefit of this disclosure.

550: Deposit a buffer layer 330 of polyimide or other suitable material over the O-plate layer 315 by any convenient manner. The buffer layer 330 will typically be approximately 500 to 1000 Angstroms (Å) thick. See also the discussion above of the buffer layer 330 in connection with FIG. 3. In this specific illustration, the buffer layer 330 also serves as an alignment layer for the A-plate layer 335 deposited next. Accordingly, the buffer layer 330 is conventionally rubbed to produce the desired surface alignment. Alternatively, a separate 500 A to 1000 A alignment layer for the subsequent A-plate layer could be deposited onto the buffer layer 330.

555: Deposit an A-plate compensator layer 335 over the buffer layer 330. The A-plate layer 335 is fabricated conventionally with well-known materials. In this specific illustration, the A-plate layer 335 is fabricated by depositing a thin film of reactive nematic liquid crystal material of approximately 1 micron thickness onto the buffer layer 330 (which functions as an alignment layer) and polymerizing the film (e.g., as described in one of the aforementioned co-pending U.S. patent applications).

560: Deposit a patterned color filter matrix layer 340 onto the A-plate layer 335. See the discussion of the color filter matrix layer 340 above. The color filter matrix layer 340 is typically in the range of 1 to 2 microns in thickness and is fabricated using techniques known to those of ordinary skill in the field of full color liquid crystal display manufacturing. The pattern of the color filter matrix layer 340 is selected to correspond to the pattern of the thin-film transistors on the display's active matrix substrate layer. As noted above in the discussion of the color filter matrix layer 340, the pattern of the color filter matrix layer also corresponds to the pattern of the black matrix layer 310.

565: Conventionally deposit a transparent electrode layer 345 of about 0.1 to 1 micron thickness onto the color filter matrix layer 340 in any convenient manner.

570: Deposit a polyimide alignment layer onto the transparent electrode layer 345 and conventionally process the alignment layer (e.g., by a patterned rub; by using two alignment materials that have a high-pretilt angle and a low-pretilt angle, respectively; or by any other convenient method) to create the liquid-crystal alignment regions 355 and 360.

At this point, the color-filter substrate 300 in accordance with the invention is essentially complete.

Possible Variations

The color filter substrate 300 can include additional compensator layers above or below the O-plate layer 315 (the terms "above" and "below" are used here and in the claims solely for convenience and are not meant to be limited to any particular vertical orientation). The additional compensator layers might or might not be pixelated in any particular implementation. Such compensator layers might include one or more of an A-plate layer, a C-plate layer, and/or an O-plate layer. These additional compensator layers might be arranged in any suitable sequence.

In an alternative embodiment, the process of fabricating the pixelated compensator elements could be performed using an etching rather than a lilt-off method as described above. Likewise, the differently oriented liquid crystal tilt domains may not be equal in area—their relative areas chosen, along with their compensation, to produce an optimum field of view having desired display contrast and gray scale stability.

It will be appreciated by those of ordinary skill having the benefit of this disclosure that another application making use of a pixelated compensator, internal to the liquid crystal display structure, is to provide optimal compensation to the oppositely oriented liquid crystal tilt domains. In this embodiment, compensator components such as A-plates or C-plates (whose required orientations are not affected by the presence of oppositely directed liquid crystal tilt domains) may also be patterned to provide different amounts or types of compensation in each tilt domain. Further, in some embodiments, an O-plate compensator component can be omitted, the pixelation being applied exclusively to A-plates, C-plates or components of other optical symmetry. In a more general case, in a liquid crystal whose tilt domains are differently oriented (i.e., having their average directors with relative orientation different from 180°), an A-plate compensator could require pixelation.

Additionally, those of ordinary skill will recognize that an active-matrix substrate 125 can be fabricated in the same general manner as described above for a color filter substrate 300 to include one or more patterned compensator layers as described above.

The discussion above relates to a normally white twisted nematic liquid crystal display. It will be appreciated that the inventive concept of a pixelated compensator layer can be expected to provide similar performance improvements in a wide range of multi-domain LCD architectures (both normally white and normally black) such as, e.g., twisted-nematic, vertically aligned cholesteric, vertically aligned nematic display systems, and various super-twist nematic display systems.

Pixelated Dual-Domain Liquid Crystal Display

It will be recognized by those of ordinary skill that the color-filter substrate 300 forms one component of a complete exemplar liquid-crystal cell 115 in a liquid crystal display 100. Other components of the liquid crystal cell 115 include an active-matrix substrate 125 and a suitable liquid crystal material 135. These components may be assembled, with the color filter substrate 300 in place of a conventional color filter substrate 130, in the usual manner. The liquid crystal cell 115 in turn is assembled with other conventional components, e.g., a polarizer 105, an analyzer 110, and one or more compensator layers 120 to form a liquid crystal display 100, also in the usual manner.

More generally, a pixelated dual-domain liquid crystal display might include combinations of components such as shown in Table 1 below. Table 1 is a partial list of useful pixelated compensator configurations. In each example, the liquid crystal layer (LC) is presented as two sections having different tilt domain orientations as designated by arrows. Compensators that are internal to the liquid crystal cell and pixelated are printed on the same line as their corresponding tilt domain and designated as different valued using subscripts and by orientation using arrows. Components that are not pixelated are shown as having identical subscripts and/or orientations for both tilt domains. Here, A represents an A-plate, C represents a C-plate, O represents an O-plate, and P represents a polarizer (representing either an analyzer or polarizer). As would be apparent to one of ordinary skill having the benefit of this disclosure, pixelated components can be placed on either side of the liquid crystal layer, depending on the design parameters a designer is attempting to optimize.

TABLE 1

Pixelated Liquid Crystal Display Elements

| ← Toward Rear (Polarizer Side) external to LC cell | internal to LC cell | | | | Toward Front (Analyzer Side) → external to LC cell |
|---|---|---|---|---|---|
| P |  | LC↑ | A₁ | O₁↑ | A₂  P |
|  |  | LC↓ | A₁ | O₂↓ |  |
| P |  | LC↑ | C₁ A₁ | O₁↑ | A₂  P |
|  |  | LC↓ | C₁ A₁ | O₂↓ |  |
| P | C₁ | LC↑ | C₂ A₁ | O₁↑ | A₂  P |
|  |  | LC↓ | C₂ A₁ | O₂↓ |  |
| P | A₁ | LC↑ | A₂ | O₁↑ | P |
|  |  | LC↓ | A₂ | O₂↓ |  |
| P | C₁ | LC↑ | A₁ | O₁↑ | P |
|  |  | LC↓ | A₁ | O₂↓ |  |
| P | C₁ | LC↑ | A₁ |  | P |
|  |  | LC↓ | C₂ A₂ |  |  |
| P |  | LC↑ | A₁ | O₁↑ | A₃  P |
|  |  | LC↓ | A₂ | O₂↓ |  |
| P | C₁ | LC↑ |  |  | P |
|  |  | LC↓ | C₂ |  |  |

The design of any particular liquid crystal display in accordance with the invention will, of course, require optimization of design parameters for the compensator layers. Those design parameters might include, e.g., the optical orientation of the compensator layers, retardation values, refractive indices, the specific sequence or order of the compensator layers, and the like. The specific design choices will depend on the engineering and business goals to be addressed by the liquid crystal display in question and would be a matter of routine engineering design for those of ordinary skill having the benefit of this disclosure. Some specific design criteria for O-plate compensator layers are discussed in one or more of the previously cited co-pending patent applications.

A Specific Design Example

Figure 6:
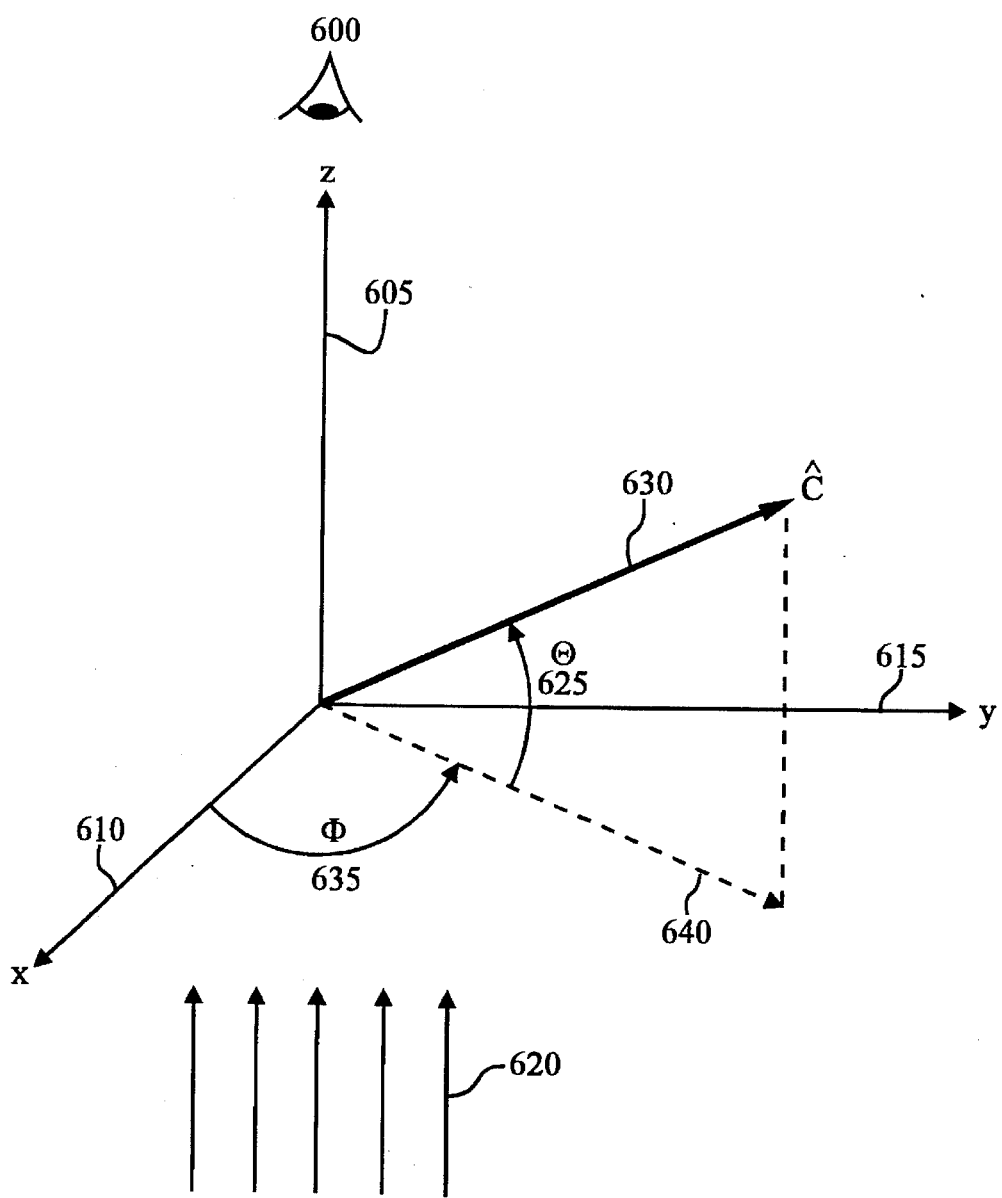
FIG. 6 depicts the coordinate system that is used to specify component orientations in the description of this invention.

FIG. 6 depicts the coordinate system which is used to describe the orientation of both liquid crystal and birefringent compensator optic axes. Light propagates toward the viewer 600 in the positive z direction 605 which, together with the x-axis 610 and the y-axis 615, form a right-handed coordinate system. Backlighting is provided, as indicated by the arrows 620, from the negative z direction. The polar tilt angle $\Theta$ 625 is defined as the angle between the liquid crystal's molecular optic axis ĉ 630 and the x–y plane, measured from the x–y plane. The azimuthal or twist angle $\Phi$ 635 is measured from the x-axis to the projection 640 of the optic axis into the x–y plane.

Figure 7:
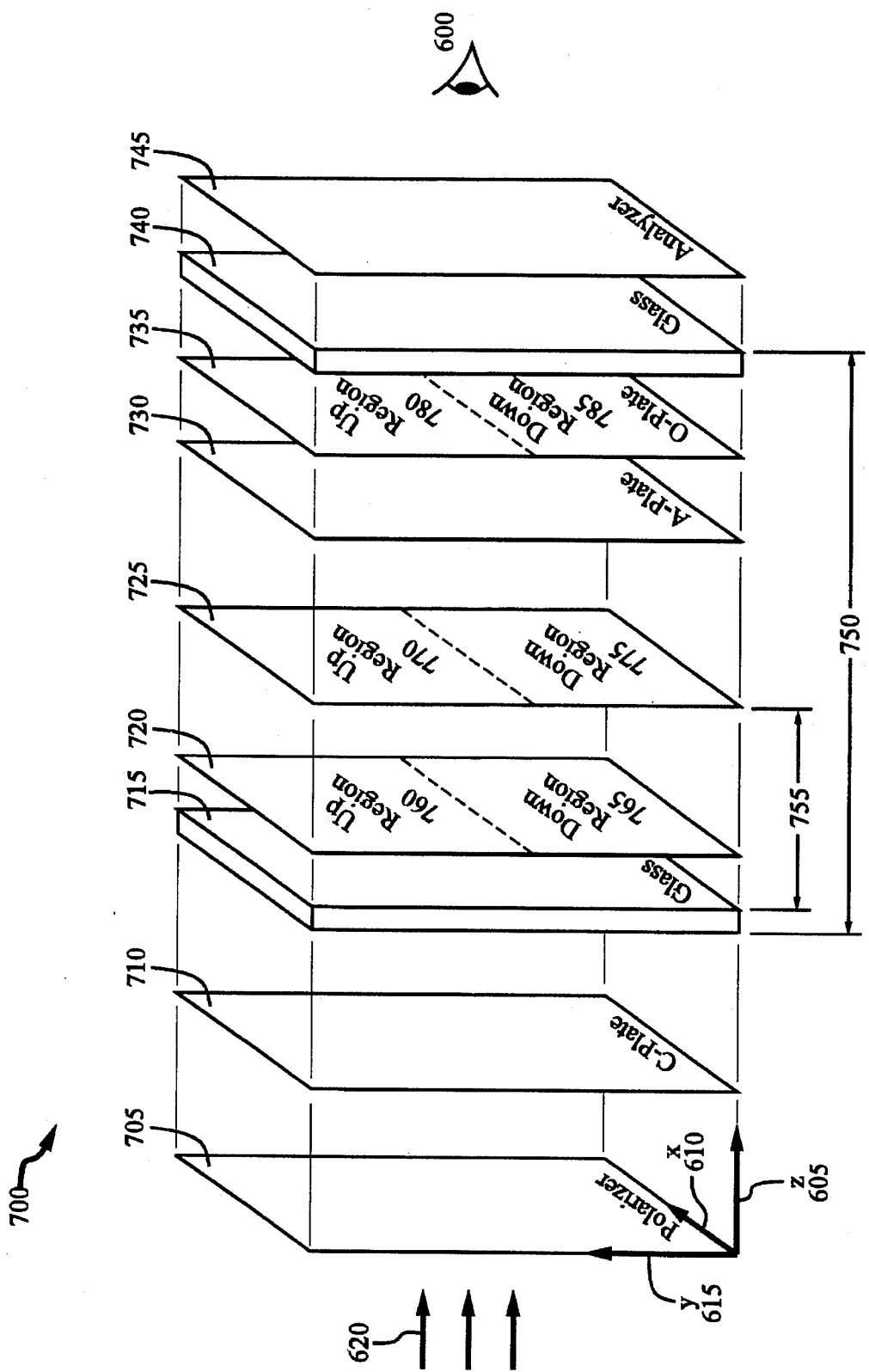
FIG. 7 shows a preferred embodiment of a pixelated compensator in accordance with the invention.

FIG. 7 shows a preferred embodiment of a pixelated compensated liquid crystal display 700 in accordance with the invention—that is, a biaxial inorganic O-plate compensator. The polarizer 705 is oriented with its transmission axis at an azimuth angle $\Phi$ of approximately 135°. The next component is a negatively birefringent C-plate 710 having a retardation 280 nm and is external to the liquid crystal cell 750. Elements 715 and 740 represent liquid crystal glass substrates. The area between substrates 715 and 740 is known as the liquid crystal cell 750.

Plane 720 is used to show the alignment of the liquid crystal material 755 on the source side glass substrate 715. The liquid crystal material 755 has a left-handed chiral pitch. As shown, the up and down tilt domain regions, 760 and 765 respectively, have alignment layer rub directions of approximately 135° and 315°. In a similar fashion, plane 725 is shown to illustrate the orientation of the liquid crystal material 755 on the viewer side of the liquid crystal material 755. The birefringence of the LC layer 755 is approximately 0.095 and has a thickness of approximately 5.2 μm. Here, the up and down tilt domain regions, 770 and 775 respectively, have alignment layer rub directions of approximately 225° and 45°.

Following the liquid crystal material is a positively birefringent A-plate layer 730 with its optic axis oriented at approximately 125°. The A-plate layer 730 has a phase retardation of approximately 73 nanometers (nm). The next element is a pixelated O-plate compensator layer 735 with its up and down tilt domain regions identified as 780 and 785 respectively. The O-plate's up domain 780 azimuthal orientation $\Phi$ is approximately 90° and its polar orientation $\Theta$ is approximately −49°. The O-plate's down domain 785 azimuthal orientation $\Phi$ is 270° and its polar orientation $\Theta$ is approximately −49°. The O-plate 735 has a thickness of approximately 0.46 μm and principal refractive indices of 1.52 (in a direction corresponding to the intersection of the refractive index ellipsoid with the plane of the O-plate layer), 1.598 (in the direction corresponding to the tilt angle of the O-plate), and 1.343 (in a direction orthogonal to the two previously defined directions). Finally, an analyzer 745 with a high transmission axis $\Phi$ of 45° is disposed between the liquid crystal cell 750 and the viewer 600.

Figure 8:
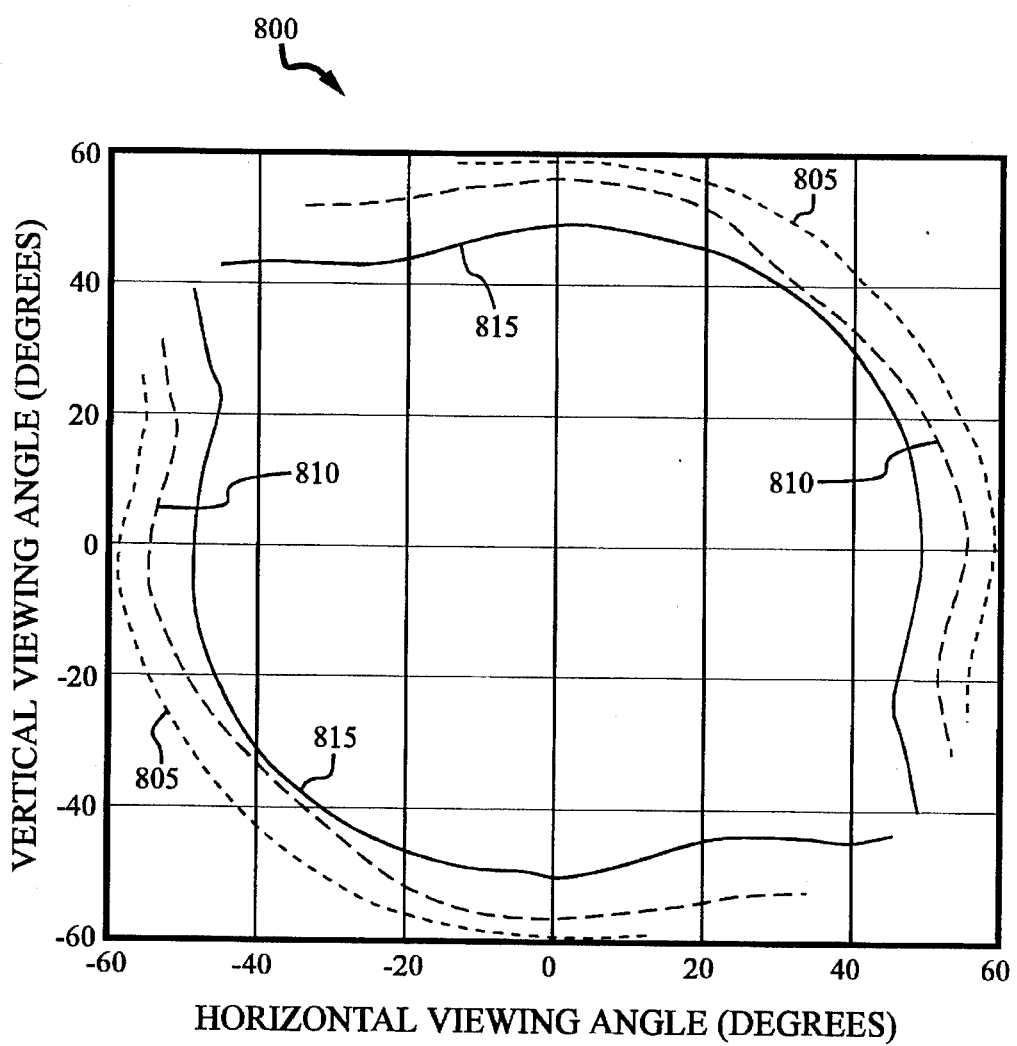
FIG. 8 shows predicted isocontrast curves for the display system of FIG. 7.

FIG. 8 shows the predicted isocontrast contours 800 of the display according to FIG. 7. Contour 805 represents an isocontrast of 30:1; contour 810 represents an isocontrast of 50:1; and contour 815 represents an isocontrast of 100:1.

Some Benefits of the Invention

A major benefit of this invention is that it provides an expanded range of viewing angles having high contrast and stabilized gray scale performance. The dual domain configuration separately provides improved gray scale stability and a symmetric, but limited, vertical viewing range. The pixelated compensation technique can optimally compensate differently oriented tilt domains to expand the range of viewing angles beyond that achievable using compensation alone on a standard single domain display; the dual domain structure insuring a vertically symmetric viewing characteristic. Further, the combination of the dual domain structure and an O-plate compensator results in gray scale stability which is generally superior to that obtained using either approach separately.

Significantly, the above-described benefits of the pixelated compensator layer, with or without an O-plate layer, are provided by a compensator layer or layers that are internal to the liquid crystal cell 115. The pixelated compensator layer(s) may thus be designed to optimally and independently compensate the differently oriented (i.e., the "up" and "down" domains of FIG. 7) tilt domains of a dual-domain liquid crystal display. Those of ordinary skill having the benefit of this disclosure will recognize that such compensation is not practicable using external patterned compensator layers because of parallax effects that occur with such compensator layers.

Incorporating the compensator as a thin-film layer internal to the liquid crystal cell 115 reduces the thickness and weight of the liquid crystal display 100 compared to conventional compensation techniques. It is believed that eliminating separate compensator layers may reduce the complexity and cost of manufacturing and assembly of the liquid crystal cell.

BIBLIOGRAPHY

1. Koike, Kamada, Okamoto, Ohashi, Tomita and Okabe, "Late-News Paper: A Full-Color TFT-LCW With a Domain-Divided Twisted-Nematic Structure," SID 92 Digest, pp. 798–801, 1992.
2. Takatori, Hirai, Kaneko, "A Complementary TN LCD with Wide-Viewing-Angle Grayscale," Proceedings 12th Int. Display Res. Conf.—Japan Display 92, pp. 591–594, 1992
3. Yang, "Two-Domain Twisted Nematic and Tilted Homcotropic Liquid Crystal Displays for Active Matrix Applications," Record 1991 Int. Display Res. Conf., San Diego, Calif., pp. 68–72, 1991.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A twisted nematic liquid crystal display comprising:
   (a) a polarizer layer:
   (b) an analyzer layer;
   (c) a liquid crystal cell comprising a liquid crystal material disposed between said polarizer layer and said analyzer layer;
   (d) said liquid crystal cell being defined by an optically transparent active matrix substrate and an optically transparent color filter substrate;
   (e) said liquid crystal cell comprising a plurality of pixels;
   (f) each said pixel comprising a pair of oppositely oriented liquid crystal tilt domains;
   (g) each said tilt domain being defined by a liquid crystal alignment region on said active matrix substrate and a liquid crystal alignment region on said color filter substrate;
   (h) a positively birefringent O-plate compensator layer having a plurality of segments, said segments on an interior surface of one of said optically transparent substrates, each said segment corresponding to a respective liquid crystal tilt domain and having an optical configuration that is optimized for that liquid crystal tilt domain;
   (i) a first positively birefringent A-plate compensator layer disposed between said liquid crystal material and said O-plate compensator layer; and
   (j) a second positively birefringent A-plate compensator layer disposed between one of said optically transparent substrates and said polarizer.

2. A twisted nematic liquid crystal display comprising:
   (a) a polarizer layer;
   (b) an analyzer layer;
   (c) a liquid crystal cell comprising a liquid crystal material disposed between said polarizer layer and said analyzer layer;
   (d) said liquid crystal cell being defined by two substrates comprising an active matrix substrate and a second substrate, each of said two substrates comprising an optically transparent substrate;
   (e) said liquid crystal cell comprising a plurality of pixels;
   (f) each said pixel comprising a pair of oppositely oriented liquid crystal tilt domains;
   (g) each said tilt domain being defined by a liquid crystal alignment region on an interior surface of said active matrix substrate and a liquid crystal alignment region on an interior surface of said second substrate;
   (h) a positively birefringent compensator layer having a plurality of segments, said segments on an interior surface of at least one of said optically transparent substrates; and
   (i) each said segment corresponding to a respective liquid crystal tilt domain and having an optical configuration that is optimized for that liquid crystal tilt domain.

3. The liquid crystal display of claim 2, wherein said second substrate is a color filter substrate.

4. The liquid crystal display of claim 2, wherein said compensator layer is selected from the group consisting of an A-plate compensator layer, an O-plate compensator layer, and a C-plate compensator layer.

5. The liquid crystal display of claim 4, further comprising one or more additional compensator layers each selected from the group consisting of an A-plate compensator layer, an O-plate compensator layer, and a C-plate compensator layer, said one or more additional compensator layers being disposed between said interior surface of the same optically transparent substrate as said compensator layer and said liquid crystal material.

6. The liquid crystal display of claim 5, wherein said one or more additional compensator layers are disposed between said compensator layer and said liquid crystal material.

7. The liquid crystal display of either of claim 5 or claim 6, wherein each of said one or more additional compensator layers is deposited in a plurality of additional compensator segments, each additional compensator segment corresponding to a respective liquid crystal tilt domain and having an optical configuration that is optimized for that liquid crystal tilt domain.

8. The liquid crystal display of claim 5, wherein one or more of said additional compensator layers has a positive birefringence.

9. A color filter substrate for a liquid crystal cell comprising:
   (a) an optically transparent substrate;
   (b) a black matrix layer deposited on said optically transparent substrate;
   (c) a positively birefringent O-plate compensator layer deposited in a pattern on said optically transparent substrate;

(d) a positively birefringent A-plate compensator layer deposited on said substrate above said O-plate compensator layer;

(e) a color filter matrix layer deposited on said optically transparent substrate;

(f) a transparent electrode layer deposited on said optically transparent substrate; and (g) an alignment layer deposited on said optically transparent substrate having an alignment pattern corresponding to the pattern of the O-plate compensator layer.

10. A liquid crystal cell substrate comprising:

(a) an optically transparent substrate and;

(b) one or more compensator layers arranged in a sequence on a first surface of said optically transparent substrate, wherein at least one of said one or more compensator layers has a position birefringence, has a plurality of segments and is referred to as a patterned compensator layer.

11. The liquid crystal cell substrate of claim 10, wherein said liquid crystal cell substrate is a color filter substrate.

12. The liquid crystal cell substrate of claim 10, wherein said liquid crystal cell substrate is an active matrix substrate.

13. The liquid crystal cell substrate of claim 10, wherein said one or more compensator layers are selected from the group consisting of an A-plate compensator layer, an O-plate compensator layer, and a C-plate compensator layer.

* * * * *

(12) REEXAMINATION CERTIFICATE (4385th)
United States Patent
Gunning, III et al.

(10) Number: US 5,589,963 C1
(45) Certificate Issued: Jun. 26, 2001

(54) PIXELATED COMPENSATORS FOR TWISTED NEMATIC LIQUID CRYSTAL DISPLAYS

(75) Inventors: William J. Gunning, III, Newbury Park; Bruce K. Winker, Moorpark, both of CA (US); Gene C. Koch, Swisher, IA (US)

(73) Assignee: Rockwell International Corporation, Cedar Rapids, IA (US)

Reexamination Request:
No. 90/004,837, Nov. 13, 1997

Reexamination Certificate for:
Patent No.: 5,589,963
Issued: Dec. 31, 1996
Appl. No.: 08/313,509
Filed: Sep. 30, 1994

(51) Int. Cl.[7] ......................... G02F 1/1335; G02F 1/1337
(52) U.S. Cl. ........................ 349/119; 349/118; 349/120; 349/126
(58) Field of Search ............................. 349/120, 117, 349/119, 180, 179, 106, 129, 108, 110, 118, 126

(56) References Cited

U.S. PATENT DOCUMENTS

| | | | |
|---|---|---|---|
| 5,249,070 | 9/1993 | Takano | 349/180 |
| 5,309,264 | 5/1994 | Lien et al. | 349/143 |
| 5,473,455 | 12/1995 | Koike et al. | 349/124 |
| 5,479,282 | 12/1995 | Toko et al. | 349/123 |
| 5,499,126 | 3/1996 | Abileah et al. | 349/106 |
| 5,504,604 | 4/1996 | Takatori et al. | 349/123 |

FOREIGN PATENT DOCUMENTS 0525473  2/1993  (EP) .

*Primary Examiner*—Kenneth Parker

(57) ABSTRACT

A novel normally-white dual-domain twisted nematic liquid crystal display exhibits dramatically improved contrast and gray scale linearity stability over a wide range of viewing angles as compared to conventional dual-domain twisted nematic displays. The display incorporates one or more pixelated compensator layers internal to the liquid crystal cell. A pixelated compensator layer has a pattern wherein the orientation or retardation of the compensator layer varies according to the tilt domain structure of the display's liquid crystal material. Such a pixelated compensator layer allows optimal compensation for each of the differently oriented liquid crystal tilt domains. The pixelated compensator layer (s), and possibly one or more non-pixelated compensator layers, may be deposited on either a display's active matrix substrate or its (passive) color filter substrate, or a combination thereof.

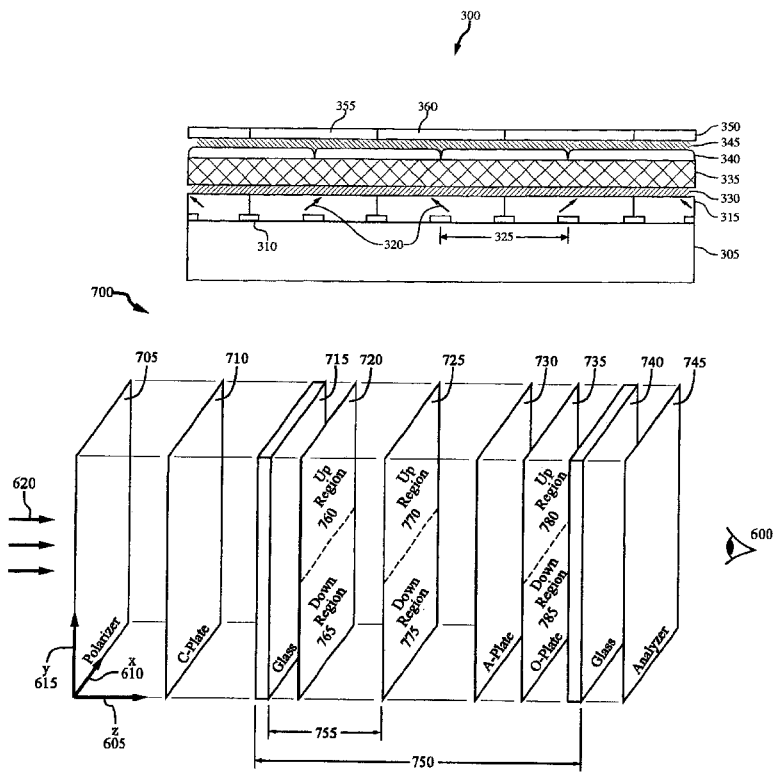

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claims 9–13 are cancelled.

Claims 2 and 4 are determined to be patentable as amended.

Claims 3 and 5–8, dependent on an amended claim, are determined to be patentable.

2. A twisted nematic liquid crystal display comprising:
(a) a polarizer layer;
(b) an analyzer layer;
(c) a liquid crystal cell comprising a liquid crystal material disposed between said polarizer layer and said analyzer layer;
(d) said liquid crystal cell being defined by two substrates comprising an active matrix substrate and a second substrate, each of said two substrates comprising an optically transparent substrate;
(e) said liquid crystal cell comprising a plurality of pixels;
(f) each said pixel comprising a pair of oppositely oriented liquid crystal tilt domains;
(g) each said tilt domain being defined by a liquid crystal alignment region on an interior surface of said active matrix substrate and a liquid crystal alignment region on an interior surface of said second substrate;
(h) a positively birefringent *O-plate* compensator layer having a plurality of segments, said segments on an interior surface of at least one of said optically transparent substrates; and
(i) each said segment corresponding to a respective liquid crystal tilt domain and having an optical configuration that is optimized for that liquid crystal tilt domain.

4. The liquid crystal display of claim 2, wherein said *liquid crystal cell further comprises a second* compensator layer [is] selected from the group consisting of an A-plate compensator layer, an O-plate compensator layer, and a C-plate compensator layer.

* * * * *